(12) United States Patent
Leinonen et al.

(10) Patent No.: US 9,727,518 B2
(45) Date of Patent: Aug. 8, 2017

(54) COMMUNICATION CONTROL PINS IN A DUAL ROW CONNECTOR

(71) Applicant: Nokia Corporation, Espoo (FI)

(72) Inventors: Pekka E. Leinonen, Turku (FI); Kai Inha, Jarvenpaa (FI); Timo T. Toivola, Turku (FI); Pekka Talmola, Turku (FI); Rune Lindholm, Sottunga (FI); Timo J. Toivanen, Mantsala (FI)

(73) Assignee: Nokia Technologies Oy, Espoo (FI)

( * ) Notice: Subject to any disclaimer, the term of this patent is extended or adjusted under 35 U.S.C. 154(b) by 796 days.

(21) Appl. No.: 14/050,927

(22) Filed: Oct. 10, 2013

(65) Prior Publication Data

US 2015/0106539 A1    Apr. 16, 2015

(51) Int. Cl.
   *H01R 29/00*      (2006.01)
   *G06F 13/42*      (2006.01)
   *G06F 13/40*      (2006.01)

(52) U.S. Cl.
   CPC .......... *G06F 13/42* (2013.01); *G06F 13/4063* (2013.01); *H01R 29/00* (2013.01)

(58) Field of Classification Search
   CPC ...... H01R 29/00; G06F 13/42; G06F 13/4063
   USPC .......................................... 439/660, 53, 218
   See application file for complete search history.

(56) References Cited

U.S. PATENT DOCUMENTS

| 5,295,843 | A | * | 3/1994 | Davis | ..................... | H01R 13/26 |
|   |   |   |   |   |   | 439/108 |
| 5,835,791 | A |   | 11/1998 | Goff et al. |   |   |
| 6,222,910 | B1 | * | 4/2001 | Price | ..................... | H04M 11/06 |
|   |   |   |   |   |   | 379/442 |
| 6,630,747 | B1 | * | 10/2003 | Kamada | ................. | H01R 29/00 |
|   |   |   |   |   |   | 307/10.1 |
| 7,361,059 | B2 | * | 4/2008 | Harkabi | ................. | H01R 27/00 |
|   |   |   |   |   |   | 439/218 |

(Continued)

FOREIGN PATENT DOCUMENTS

| EP | 1487081 A2 | 12/2004 |
| EP | 2264611 A1 | 12/2010 |

(Continued)

OTHER PUBLICATIONS

Universal Serial Bus 3.0 Specification.

(Continued)

*Primary Examiner* — Paul R Myers
(74) *Attorney, Agent, or Firm* — Mintz Levin Cohn Ferris Glovsky and Popeo, P.C.

(57) ABSTRACT

Methods and apparatus, including computer program products, are provided for communications control in a dual row connector. In one aspect there is provided a method. The method may include coupling a first data connector including a pair of communication control pins and another pair of communication control pins, wherein the pair further comprises a first communication control pin located at a first row of the first data connector and a second communication control pin located at a second row of the data connector, wherein the other pair further comprises a third communication control pin located at the first row of the first data connector and a fourth communication control pin located at the second row of the first data connector. Related apparatus, systems, methods, and articles are also described.

15 Claims, 7 Drawing Sheets

(56) References Cited

U.S. PATENT DOCUMENTS

| | | | |
|---|---|---|---|
| 7,387,539 B2* | 6/2008 | Trenne | H01R 13/642 439/218 |
| 7,440,287 B1* | 10/2008 | Ni | H01R 27/00 174/50.51 |
| 7,493,437 B1* | 2/2009 | Jones | G06F 13/38 710/301 |
| 7,865,629 B1 | 1/2011 | Tantos et al. | |
| 8,043,099 B1* | 10/2011 | Ni | G06K 19/07732 439/131 |
| 8,057,106 B1* | 11/2011 | Zhovnirovsky | G02B 6/322 385/139 |
| 8,882,524 B2* | 11/2014 | Golko | H01R 13/6273 439/218 |
| 8,911,260 B2* | 12/2014 | Golko | H01R 13/6581 439/108 |
| 2002/0049887 A1 | 4/2002 | Takahashi | |
| 2002/0169915 A1 | 11/2002 | Wu | |
| 2003/0172318 A1 | 9/2003 | Sugita et al. | |
| 2006/0024997 A1* | 2/2006 | Teicher | H01R 27/00 439/217 |
| 2006/0076977 A1* | 4/2006 | Zhu | G06F 13/4081 326/86 |
| 2007/0241769 A1 | 10/2007 | Song et al. | |
| 2007/0243769 A1* | 10/2007 | Atsmon | G06K 19/077 439/660 |
| 2008/0076301 A1* | 3/2008 | Liu | G06F 13/409 439/630 |
| 2008/0215765 A1 | 9/2008 | Butler et al. | |
| 2011/0136381 A1* | 6/2011 | Cho | H01R 13/6641 439/620.01 |
| 2012/0159008 A1 | 6/2012 | Park et al. | |
| 2012/0290761 A1* | 11/2012 | Chen | G06F 13/42 710/305 |
| 2013/0029527 A1* | 1/2013 | Mullins | H01R 24/60 439/620.21 |
| 2013/0080801 A1* | 3/2013 | Choi | G06F 1/266 713/310 |
| 2013/0108065 A1* | 5/2013 | Mullins | G01R 31/31701 381/58 |
| 2013/0117470 A1 | 5/2013 | Terlizzi et al. | |
| 2013/0305066 A1* | 11/2013 | Mullins | G06F 1/266 713/310 |
| 2014/0073188 A1* | 3/2014 | Fritchman | G06F 1/1632 439/620.21 |
| 2014/0075069 A1* | 3/2014 | Mullins | H04M 1/0274 710/106 |
| 2014/0129740 A1* | 5/2014 | Wang | G06F 13/385 710/15 |
| 2014/0206209 A1* | 7/2014 | Kamei | H01R 24/60 439/81 |
| 2014/0208134 A1 | 7/2014 | Waters et al. | |
| 2014/0280960 A1 | 9/2014 | Paramasivam et al. | |
| 2015/0255933 A1* | 9/2015 | Sung | H01R 13/6585 439/607.01 |
| 2015/0356045 A1 | 12/2015 | Soffer | |

FOREIGN PATENT DOCUMENTS

| | | |
|---|---|---|
| EP | 2381571 A2 | 10/2011 |
| EP | 2590274 A2 | 5/2013 |
| JP | 2002007010 A | 1/2002 |
| JP | 2002312085 A | 10/2002 |
| JP | 2006068396 A | 3/2006 |

OTHER PUBLICATIONS

Universal Serial Bus 3.1 Specification.
PCT Search Report dated May 15, 2014 for PCT application No. PCT/IB2013/056618.
USB Battery Charging Specification V1.2 Compliance Plan, Revision 1.0, Oct. 12, 2011.

* cited by examiner

600

Coupling a first device to a second device via a universal serial bus cable assembly having only a single connection for a CC pin but not a corresponding connection for another CC pin 605

Detect a change, such as a current flow, associated with at least one of the CC pins 610

Assign CC signaling/communication to the detected CC pin 620

FIG. 6

COMMUNICATION CONTROL PINS IN A DUAL ROW CONNECTOR

FIELD

The subject matter described herein relates to connectors and/or cables associated with the Universal Serial Bus (USB).

BACKGROUND

Physical connectors, such as the connector used with the Universal Serial Bus (USB), can be used to couple devices. USB standards define physical and electrical aspects of USB. Examples of those standards include Universal Serial Bus 3.1 Specification, Universal Serial Bus 3.0 Specification, and any additions, revisions, and updates thereto.

SUMMARY

Methods and apparatus, including computer program products, are provided for communications control in a dual row connector.

In some example embodiments, there is provided an apparatus. The apparatus may include a first data connector including a pair of communication control pins and another pair of communication control pins, wherein the pair further comprises a first communication control pin located at a first row of the first data connector and a second communication control pin located at a second row of the data connector, wherein the other pair further comprises a third communication control pin located at the first row of the first data connector and a fourth communication control pin located at the second row of the first data connector.

In some variations, one or more of the features disclosed herein including the following features can optionally be included in any feasible combination. The apparatus may further include a second data connector including a first pair of communication control pins and a second pair of communication control pins, wherein the first pair further comprises a fifth communication control pin located at a top row of the second data connector and a sixth communication control pin located at a bottom row of the second data connector, wherein the second pair further comprises a sixth communication control pin located at the top row of the second data connector and a eighth communication control pin located at the bottom row of the second data connector; and a cable including at least one wire coupling the first communication control pin and the fifth communication control pin. The first communication control pin and the second communication control pin may be coupled at the first data connector, and wherein the fifth communication control pin and the sixth communication control pin may be coupled at the second data connector. The first communication control pin and the second communication control pin may be coupled at the first data connector. The first data connector may include a universal serial bus connector.

Moreover, there is provided in some example embodiments an apparatus including a data connector including a first communication control pin and a second communication control pin, wherein the first communication control pin and the second communication control pin are pulled up by at least one pull-up resistor; detection circuitry to detect one communication control pin of the first and the second communication control pins by at least detecting a current flow caused by at least the pull-up when coupled to the data connector and another device; and communication circuitry coupled to the one communication control pin detected by the detection circuitry and configured to communicate according to a communication protocol.

In some variations, one or more of the features disclosed herein including the following features can optionally be included in any feasible combination. The data connector may include a first row including the first communication control pin and the second communication control pin, and a second row including a third communication control pin and a fourth communication control pin. The apparatus may include at least another pull-up, wherein the other pull-up may be configured to be connected to the one communication pin when detected by the detection circuitry. The other pull-up may include another pull-up resistor comprising a higher resistance than the at least one pull-up resistor. The communication circuitry may be configured to communicate according to another communication protocol, when the detection circuitry detects a current flow both in the first communication control pin and the second communication control pin. The first communication control pin may be coupled to the third communication control pin and wherein the second communication control pin may be coupled to the fourth communication control pin. The first data connector may include a universal serial bus connector.

Furthermore, there is provided in some example embodiments an apparatus including a data connector including a first communication control pin and a second communication control pin, wherein the first communication control pin and the second communication control pin are pulled down by at least one pull-down resistor; detection circuitry configured to detect one communication control pin of the first and the second communication control pins by at least detecting a current flow caused by at least the pull down when coupled to the data connector and another device; and communication circuitry coupled to the one communication control pin detected by the detection circuitry and configured to communicate according to a communication protocol.

In some variations, one or more of the features disclosed herein including the following features can optionally be included in any feasible combination. The data connector may include a first row including the first communication control pin and the second communication control pin, and a second row including a third communication control pin and a fourth communication control pin. The communication circuitry may be configured to communicate according to another communication protocol, when the detection circuitry detects a current flow both in the first communication control pin and the second communication control pin. The first communication control pin may be coupled to the third communication control pin and wherein the second communication control pin may be coupled to the fourth communication control pin.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 6 depicts an example process for depicting at least one of the communication control pin, in accordance with some exemplary embodiments.

Figure 1:
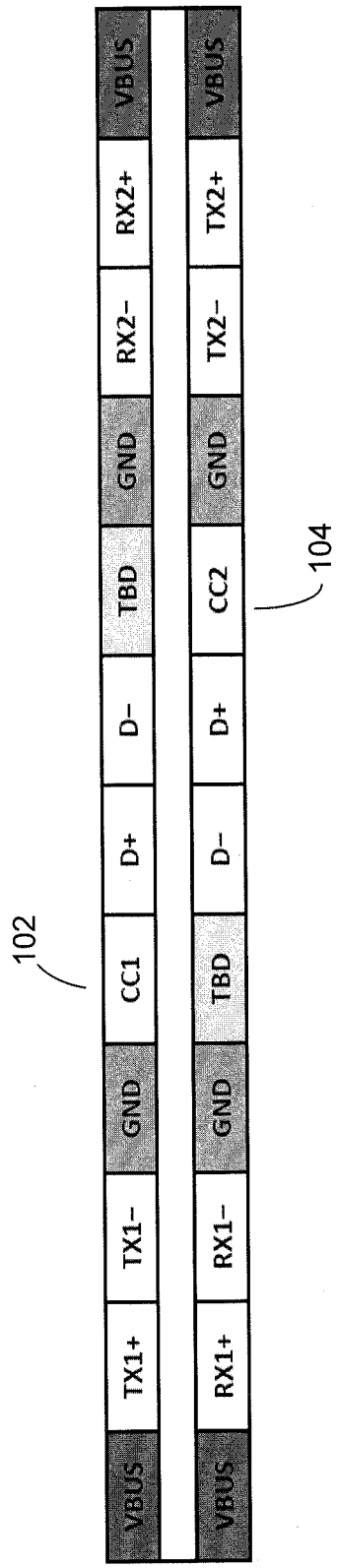
FIG. 1 depicts an example of a data connector.

Like labels are used to refer to same or similar items in the drawings.

DETAILED DESCRIPTION

FIG. 1 depicts an example of a data connector including a single, relatively small-sized data connector having ends that can be swapped, so that an end-user does not need to be concerned with whether the connectors are connected to a host or a slave device. Nor does the end-user have to be concerned with which way the plug is inserted into a receptacle. Although a dual row USB connector may be implemented as depicted at FIG. 1, there may be implementations where only a portion, such as a single row, of the connector is populated with pins, or galvanic connectors. Moreover, when a single row is populated at the connector at FIG. 1, this may affect the ability of devices to detect the orientation of the connector as a first communication control (CC1) pin appears in the first row, and a second communication control pin (CC2) appears in the second row. As such, if only a top row is populated and the connector is re-oriented by 180 degrees (for example, rotated or twisted), the CC2 pin 104 may not be active with a pin and the like to provide a connection.

Some implementations of USB may also include a power negotiation process communicating via a frequency shift key (FSK) modulation scheme over the VBUS path (or line). This power delivery (PD) negotiation scheme may be too complex for some implementations, especially simpler, lower cost devices and accessories. Moreover, the PD negotiation scheme may also require a VBUS coil, which may add additional and unnecessary direct current (DC) resistance in the charging path.

The subject matter disclosed herein may provide, in some example embodiments, two CC pairs for a total of four CC pins. The use of four CC pins allows devices to distinguish between a direct plug connection and a rotated or twisted plug connection. Moreover, the two CC pairs may be used as a communication path, such as a path for power delivery negotiation communication to determine initial power roles of USB ports (for example, whether a device is a power provider or a power consumer), although the communication path may be used for other purposes as well. This communication path may provide a low rate communication path as an alternative (or in addition to) to other power delivery negotiations communications paths.

Figure 2:
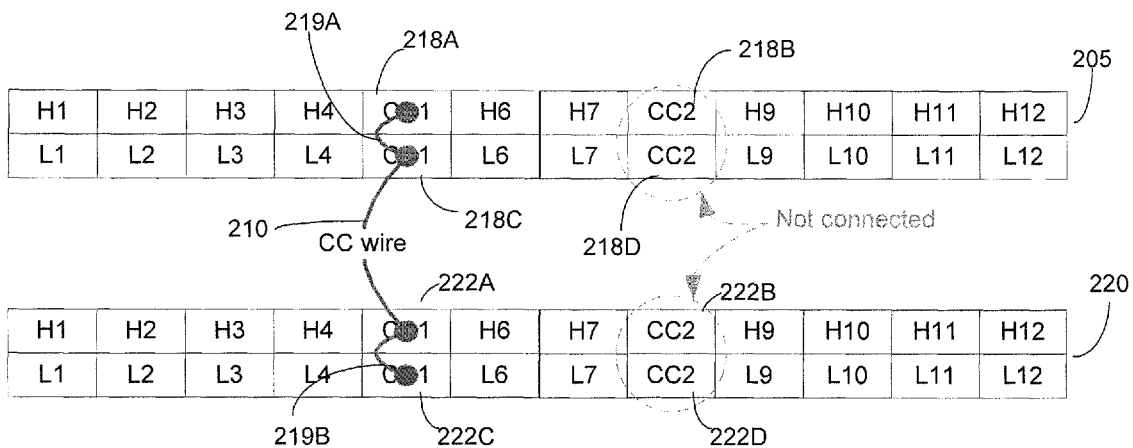
FIG. 2 depicts examples of data connectors and interfaces having two pairs of communication control pins, in accordance with some exemplary embodiments.

FIG. 2 depicts an example of a USB connector 205, a cable including at least one wire 210, and another USB connector 220, in accordance with some example embodiments. The USB connector 205 may be inserted into a corresponding USB receptacle 299A, and USB connector 220 may be inserted into a corresponding USB receptacle 299B.

The first USB connector 205 may, in some example embodiments, include two pairs of CC pins 218A-D, such that each row has a CC1 pin and a CC2 pin. The first row includes CC1 pin 218A and CC2 pin 218B, and the second row includes CC1 pin 218C and CC2 pin 218D. In the example of FIG. 2, CC1 pins 218A and 218C are coupled 219A, and wire 210 may couple those pins 218A-C to USB connector 220, where CC1 pins 222A and 222C may also be coupled 219B. This configuration may ensure that the CC pins are always routed between both connectors 205 and 220 and receptacles 299A-B, when connected. Via the CC-pins one of the CC-lines at the devices are pulled either up or down, so that the change in for example voltage can be detected and thus that location where certain CC pins 218A/218C or 222A/222C are connected. The CC pins may also be used for host/slave detection based on the CC-line voltage (or current) change.

Figure 3:
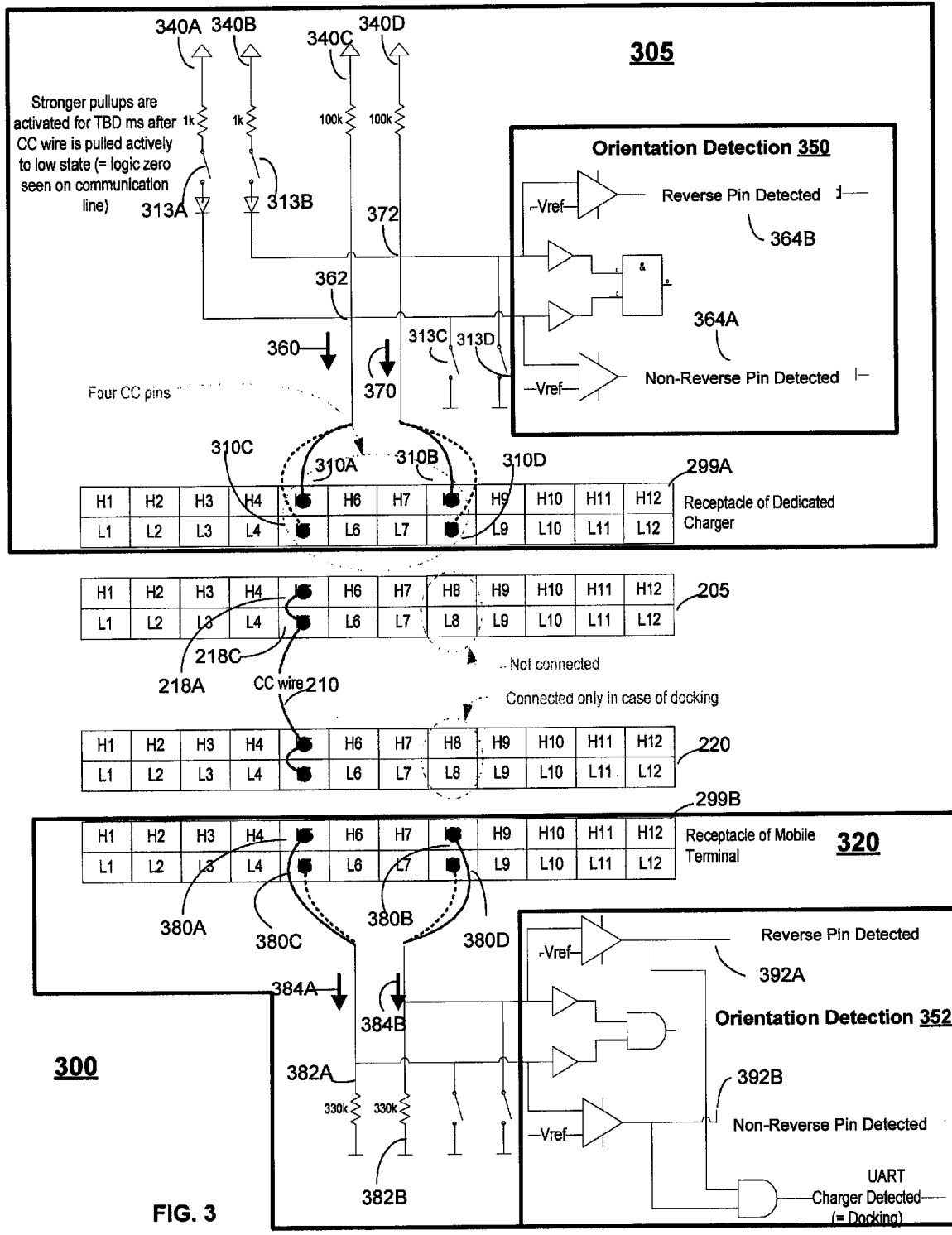
FIG. 3 depicts an example of a system in which the connectors and interfaces of FIG. 2 may be used in accordance with some exemplary embodiments.

FIG. 3 depicts an example of a system 300 configured for determining the orientation of the USB connector, in accordance with some example embodiments. System 300 may, in some example embodiments, distinguish between connector 205 and connector 205 rotated (or twisted by) 180 degrees, although twists in the wire and/or the other connector may be detected as well. The orientation detection also enables detection of the active CC line(s). In the example of FIG. 3, CC1 is active, and can be used, in some example embodiments, to send data and/or receive data. For example, after detecting connector orientation, stronger (for example, 1 kilo-ohm) pull-up resistors 340A or 340B may be connected at the device 305 to enable low rate communication through the connected CC pin The system 300 includes a first device, such as a charger 305 and the like, and a second device, such as a user equipment 320. The charger 305 may include a receptacle 299A including two pairs of CC pins 310A-D. However, only one of the rows, such as the top row or the bottom row, may be populated by pins, although both rows may be populated as well. In the example of FIG. 3, CC1 pin 310A and CC2 pin 310B are populated with pins and coupled to device circuitry including pull up resistors 340A-D and orientation detection circuitry 350. When device 320, receptacle 299B, connector 220, wire 210, and connector 205 couple to device 305 including receptacle 299A, current flows in a certain CC path. Current may flow at 360 through CC1 pins 310A, 218A, 218C, wire 210, and so forth. This current flow is detected at 362 by orientation detection circuitry 350, which outputs one or more control signals 364A-B indicative of the orientation. In the example of FIG. 3, the output may signal 364A a non-reversed connector. However, if connector 205A were rotated 180 degrees and inserted into receptacle 299A, current would instead flow at 370 through CC2 pins 310B, 218A/218C (which has been rotated), and so forth. This current flow is detected at 372 by orientation detection circuitry 350, which may signal 364B a reversed connector.

The control signals 364A/364B may be used to switch a stronger pull up resistor 340A or 340B and/or allow communication control (CC) communication to flow through the CC pin which has been detected by the orientation detector 350. The stronger pull up may occur after a certain time to allow data to flow via 310A/310C.

In the example of FIG. 3, device 320 may include circuitry similar to the circuitry noted above with respect to device 305. For example, CC1 pin 380A and CC2 pin 380B may be populated with pins and coupled to the device circuitry including pull down resistors 382A-B and orientation detection circuitry 352. When device 305, receptacle 299A, connector 205, wire 210, and connector 220 couple to device 320 including receptacle 299B, current flows in a certain CC path. In the example of FIG. 3, current flows at 384A through CC1 pin 380A. This current flow is detected by orientation detection circuitry 352, which detects the orientation and outputs one or more control signals 392A-B to indicate the orientation of the connector 220. In the example of FIG. 3, the output 392B may signal a non-reversed connector. If connector 220 were rotated 180 degrees and inserted into receptacle 299B, current would flow at 384B, which would be detected by orientation detection circuitry 352 and thereby causing a reversed connector control signal 392A.

In some example embodiments, the device 320 may be implemented as user equipment, an example of which is described further below with respect to FIG. 7. The device 320 may, in some example embodiments, be configured to pull down CC pins 380A, 380B, and any other CC pins at connector 299B. Although this example refers to pulling down CC pins, the pins may also be pulled up (in which case the other device would pull down the CC pins). The device 320 may, in some example embodiments, detect whether the CC pin or pairs of CC pins are connected. When the CC pin or pair of CC pins are detected, device 320 may then initiate communications via the detected CC pin(s) to the other device 205.

In some example embodiments, the dual row connector-cable-dual connector assembly 205/210/220 may include two pairs of CC pins (CC) at each end of the cable. For example, connector 205 at FIG. 2 includes two pairs of CC pins 218A/C and 218 B/D, and connector 220 includes two pairs of CC pins 222A/C and 222 B/C. The CC pins are located on distal portions of the connector 205. For example, CC pins 218A/218C are located on the left hand side of connector 205, and CC pins 218B/218D are on the corresponding opposite side. Indeed, CC pins 218A/218C are located at the 5th position moving left to right, while CC pins 218B/218D are located at the 5th position moving right to left, although other placements may be used as well. As a consequence, CC pins 218A/218C mirror CC pins 218B/218D, so that twisting connector 205 places CC pins 218A/218C at the same position as CC pins 218B/218D. Moreover, connector 205 may also include CC pin pair 218A/C coupled via a wire 210 to another pin pair 222A/C at connector 220, but CC pin 218B/D may not be connected through to connector 220.

Figure 4:
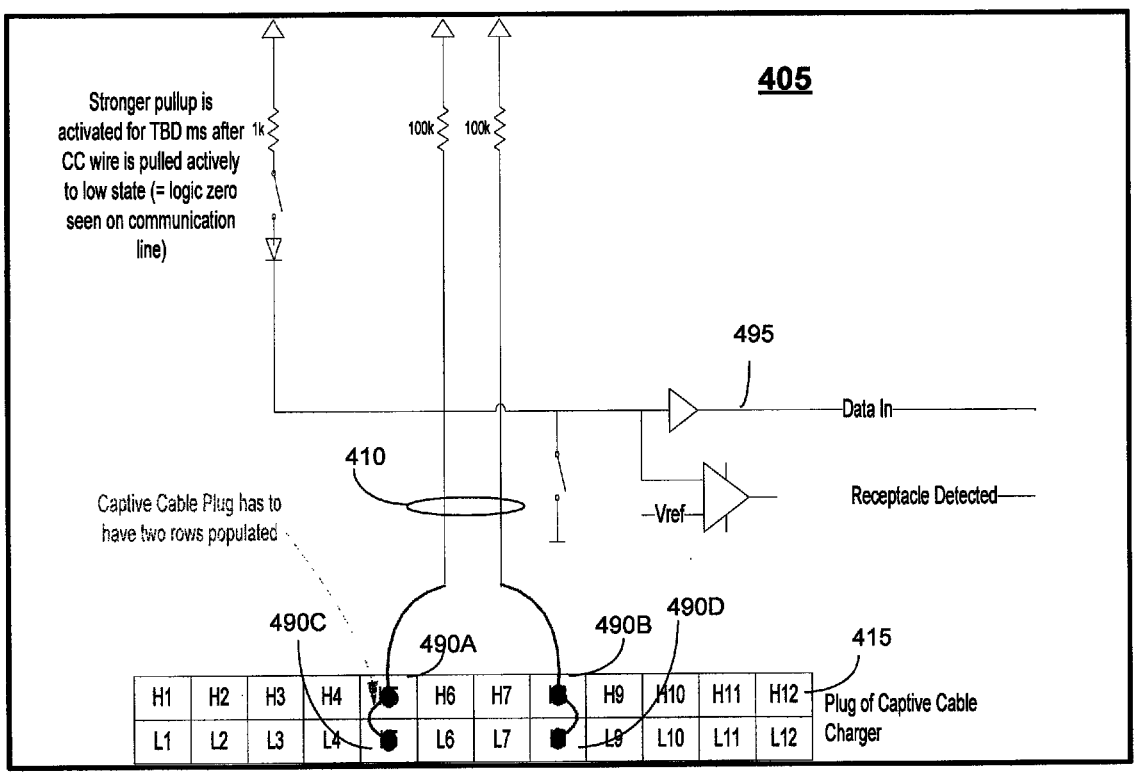
FIGS. 4-5 depict examples of systems including two pairs of communication control pins, in accordance with some example embodiments.
Figure 4:
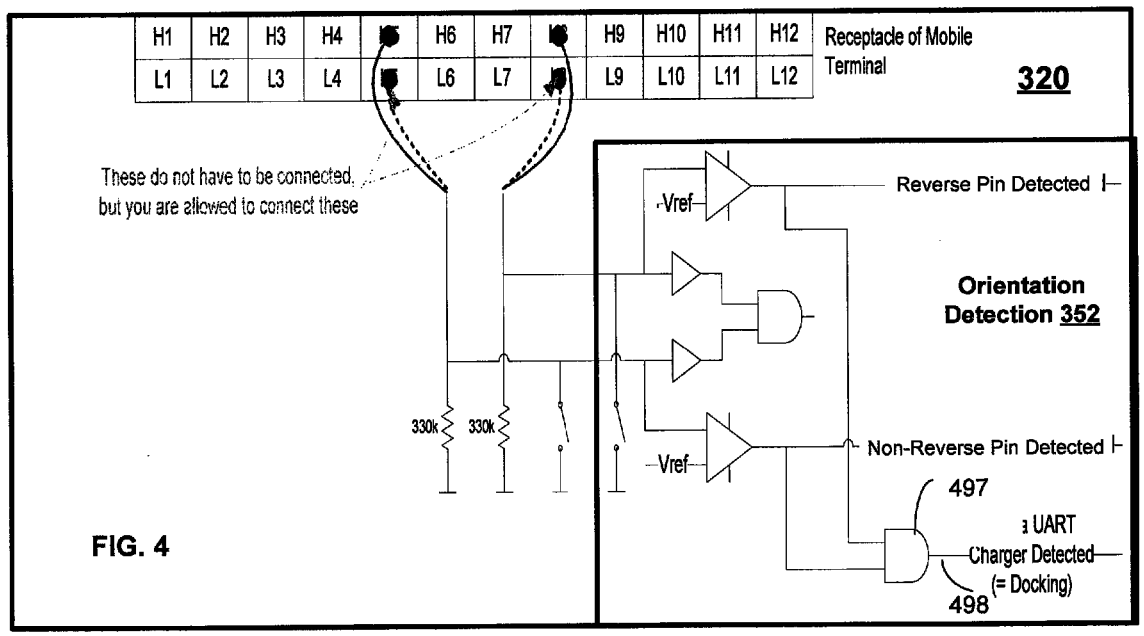

FIG. 4 depicts an example of a system 400, in accordance with some example embodiments. System 400 is similar to system 300 in some respects but includes a device 405 having an integrated (or captive) cable 410 and connector 415. For example, the device 405 may be implemented as a charger or other accessory, which includes an integrated/captive cable 410 and connector 415. The connector 415 may be implemented in the same manner as noted above with respect to 299A. When this is the case, connector 415 includes two pairs of CC pins 490A-D. Moreover, device 405, unlike device 305, may not include the orientation detection circuitry 350 described with respect to FIG. 3. In the example of FIG. 4, after the orientation is detected, device/charger 405 pulls up both pairs of CC lines, which is detected by device 320 at the orientation detection circuitry 352. For example, the AND function may be used to detect whether the connector 415 orientation (for example, reversed or not), and this signal may be used to enable communications through one of the CC pins.

Figure 5:
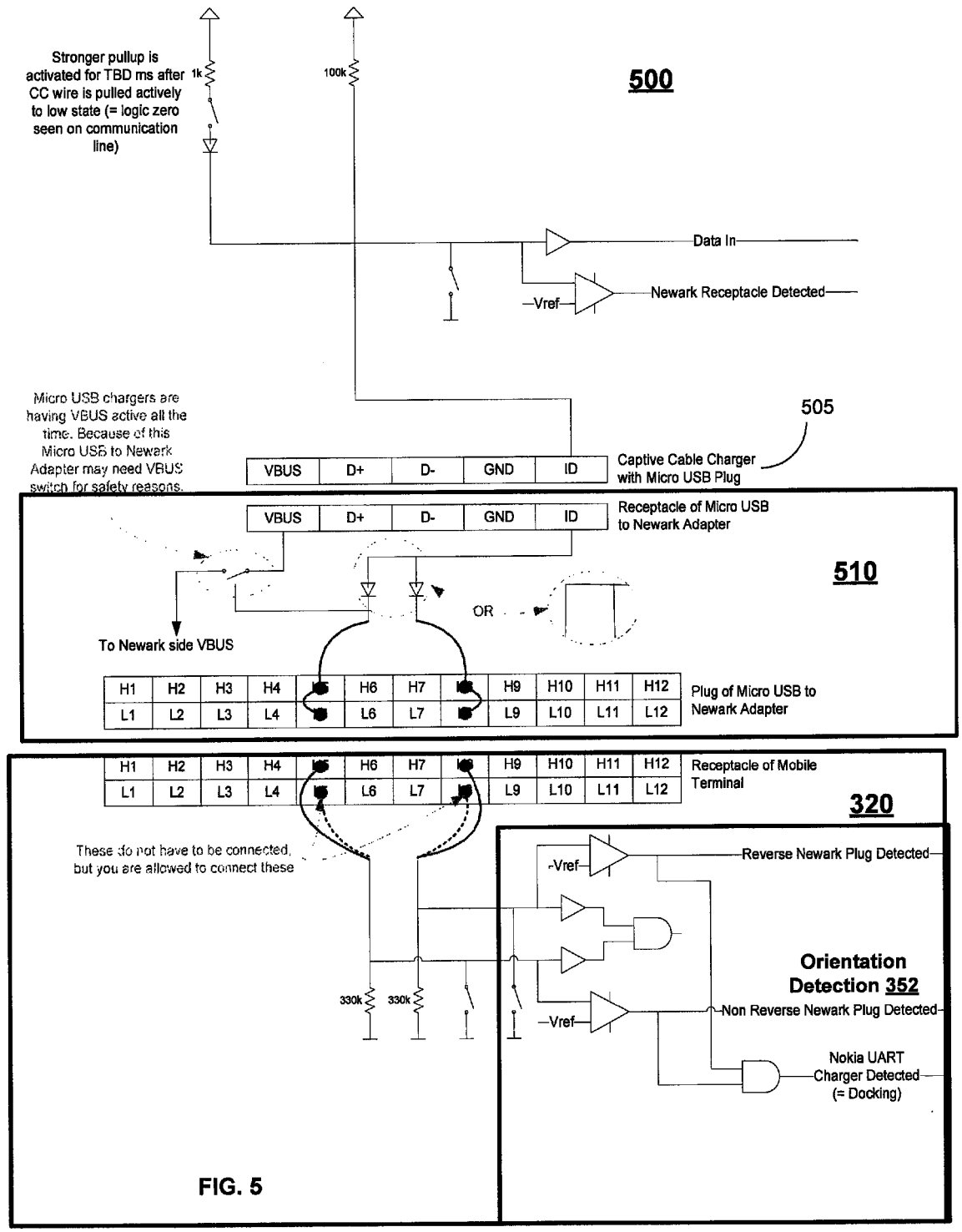

FIG. 5 depicts an example of a system 500, in accordance with some example embodiments. System 500 is similar to system 400 in some respects but adds a micro USB configuration. Specifically, a micro USB plug 505, micro USB receptacle adapter 510 is added to interface with connector 515, which is the same or similar to connector 205, 299A, 415, and the like.

FIG. 6 depicts a process for communication control via a universal serial bus, in accordance with some example embodiments. The description of FIG. 6 also refers to FIGS. 2 and 3.

At 605, a first device is coupled to a second device, in accordance with some example embodiments. For example, a first device, such as device 305 may include two pairs of CC pins as depicted at FIGS. 2 and 3. Moreover, the CC pins may both be pulled up by pull up resistors. The first device 305 may be coupled to the second device 320 via connector-cable-connector assembly 205/210/220. Furthermore, the cable may however not connect both pairs of CC pins, but instead have a single wire 210 connecting a single pair of CC pins. The CC pins at device 320 may be pulled down.

At 610, a current flow is detected at one the CC pins, in accordance with some example embodiments. For example, orientation detection circuit 352 may detect a current flow associated with the CC pair 310A/C coupling via wire 210 to CC pair 380A/C. As such, device 320 may recognize the orientation of the connector and/or the CC pin(s) which are active. In the example of FIG. 3, CC pins 380A/C are active, so device 320 may recognize that CC pins 380A/C are active, but CC pins 380B/D are not (by virtue of a lack of connection via connector-cable-connector assembly 205/210/220).

At 620, devices 305 and 320 may access the detected CC pin for communication control (or other purposed) between device 305 and 320, in accordance with some example embodiments. In the example of FIG. 3, device 305 may couple data, such as communication control signaling, to the detected CC pin(s), such as 310A. Device 320 may couple data, such as communication control signaling, to CC pin detected at 610 (for example, CC pin 380A). This coupling may be under the control of circuitry 350 and one or more of switches 313A-D.

Figure 7:
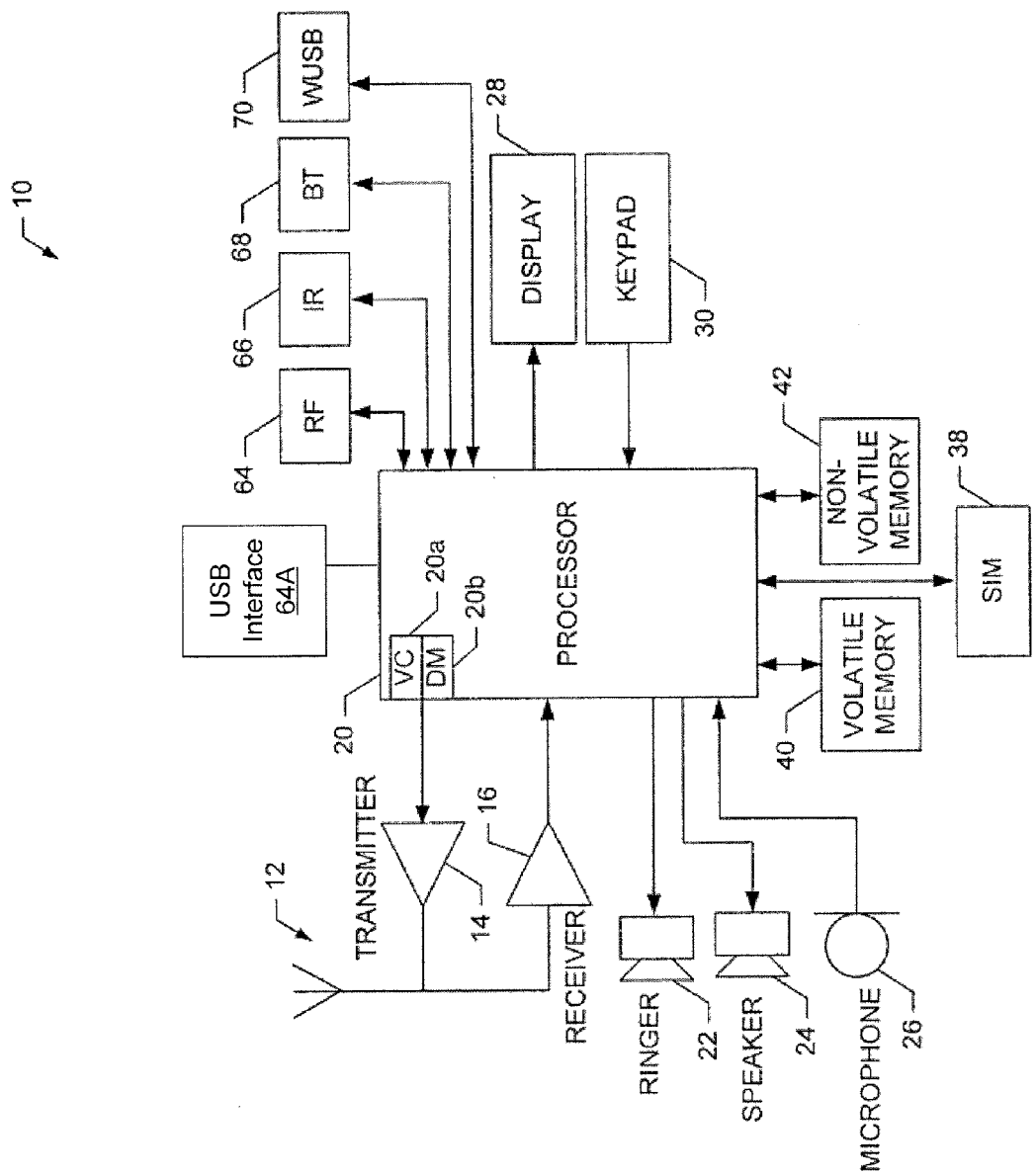
FIG. 7 depicts an example of an apparatus, in accordance with some exemplary embodiments.

FIG. 7 illustrates a block diagram of an apparatus 10, which can be configured as user equipment, in accordance with some example embodiments. The apparatus 10 may include USB interface 614A, which may include one or more aspects of the systems and methods disclosed herein including connectors, pull up resistors, pull down resistors, detection circuitry, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Apparatus 10 may include a location processor and/or an interface to obtain location information, such as positioning and/or navigation information. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

Moreover, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example the functions disclosed at process 200. The memories may comprise an identifier, such as for example, an international mobile equipment identification (IMEI) code, capable of uniquely identifying apparatus 10. In the example embodiment, the processor 20 may be configured using computer code stored at memory 40 and/or 42 to perform or cause process 600 or other operations disclosed herein with respect to the devices at FIGS. 3-5, and/or the like as disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example a computer or data processor circuitry, with examples depicted at FIG. 6 (for example, process 600 or other operations disclosed herein with respect to the devices at FIGS. 3-5). A computer-readable medium may comprise a non-transitory computer-readable storage medium that may be any media that can contain or store the instructions for use by or in connection with an instruction execution system, apparatus, or device, such as for example a computer. Furthermore, some of the embodiments disclosed herein include computer programs configured to cause and/or provide methods as disclosed herein (see, for example, process 600 and/or the like).

Without in any way limiting the scope, interpretation, or application of the claims appearing below, a technical effect of one or more of the example embodiments disclosed herein is reduced complexity for some devices by eliminating the need to populate both the top and bottom rows of the connector and enabling communications via a detected communication control path.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." As used herein, a connector may be a male connector (in which case it may be referred to as a plug) or a female connector (in which case it may also be referred to as a receptacle).

What is claimed:

1. An apparatus comprising:
   a data connector including a communication pin, a first communication control pin and a second communication control pin, wherein the first communication control pin and the second communication control pin are pulled up by a first pull-up having a first pull-up resistor;
   detection circuitry to detect which of the first and the second communication control pins is an active communication control pin, based on at least detecting a current flow caused by the first pull-up when coupled to the data connector and an external device, and to determine an orientation of the data connector based on the current flow or a change in voltage at the active communication control pin;
   a second pull-up configured to be connected, in response to the detection of the active communication control pin, to the active communication control pin, the second pull-up having a second pull-up resistor with a higher resistance than the first pull-up resistor; and
   communication circuitry, coupled to the active communication control pin, configured to communicate according to a communication protocol after detecting the orientation of the data connector coupled to the external device.

2. The apparatus of claim 1, wherein the data connector includes:
   a first row including the first communication control pin and the second communication control pin, and
   a second row including a third communication control pin and a fourth communication control pin.

3. The apparatus of claim 1, wherein the communication circuitry is configured to communicate according to another communication protocol, when the detection circuitry detects a current flow both in the first communication control pin and the second communication control pin.

4. The apparatus of claim 2, wherein the first communication control pin is coupled to the third communication control pin and wherein the second communication control pin is coupled to the fourth communication control pin.

5. The apparatus of claim 1, wherein the data connector comprises a universal serial bus connector.

6. An apparatus comprising:
   a data connector including a communication pin, a first communication control pin and a second communication control pin, wherein the first communication control pin and the second communication control pin are pulled down by a first pull down having a first pull-down resistor;
   detection circuitry configured to detect which of the first and the second communication control pins is an active communication control pin, based on at least detecting a current flow caused by the first pull down when coupled to the data connector and an external device, and to determine an orientation of the data connector based on the current flow or a change in voltage at the active communication control pin;

a second pull-down configured to be connected, in response to the detecting of the active communication control pin, to the active communication control pin, the second pull-down having a second pull-down resistor with a higher resistance than the first pull-down resistor; and communication circuitry coupled to the active communication control pin detected by the detection circuitry and configured to communicate according to a communication protocol after detecting the orientation of the data connector coupled to the external device.

7. The apparatus of claim 6, wherein the data connector includes:
   a first row including the first communication control pin and the second communication control pin, and
   a second row including a third communication control pin and a fourth communication control pin.

8. The apparatus of claim 6, wherein the communication circuitry is configured to communicate according to another communication protocol, when the detection circuitry detects a current flow both in the first communication control pin and the second communication control pin.

9. The apparatus of claim 7, wherein the first communication control pin is coupled to the third communication control pin and wherein the second communication control pin is coupled to the fourth communication control pin.

10. A method comprising:
    pulling up a first communication control pin and a second communication control pin, the first and the second communication control pins included in a data connector having a communication pin;
    detecting which of the first and the second communication control pins is an active communication control pin, based on at least detecting a current flow caused by at least the pulling-up, when coupled to the data connector and an external device, and to determine an orientation of the data connector based on the current flow or a change in voltage at the active communication control pin;
    connecting, in response to the detecting of the active communication control pin, a second pull-up to the active communication control pin, the second pull-up having a second pull-up resistor with a higher resistance than the first pull-up resistor; and
    coupling a communication circuitry to the active communication control pin, the communication circuitry configured to communicate according to a communication protocol, after detecting the orientation of the data connector coupled to the external device.

11. The method of claim 10, wherein the data connector includes a first row including the first communication control pin and the second communication control pin, and a second row including a third communication control pin and a fourth communication control pin.

12. A method comprising:
    pulling down a first communication control pin and a second communication control pin, wherein the first and second communication control pins included in a data connector having a communication pin;
    detecting which of the first and the second communication control pins is an active communication control pin, based on at least detecting a current flow caused by at least the pulling down, when coupled to the data connector and an external device, and to determine an orientation of a data connector based on the current flow or a change in voltage at the active communication control pin;
    connecting, in response to the detecting of the active communication control pin, a second pull-down to the active communication control pin, the second pull-down having a second pull-down resistor with a higher resistance than the first pull-down resistor; and
    coupling a communication circuitry to the active communication control pin, the communication circuitry configured to communicate according to a communication protocol after detecting the orientation of the data connector coupled to the external device.

13. The method of claim 12, wherein the data connector includes a first row including the first communication control pin and the second communication control pin, and a second row including a third communication control pin and a fourth communication control pin.

14. A non-transitory computer-readable storage medium including computer code which when executed by at least one processor causes operations comprising:
    pulling up a first communication control pin and a second communication control pin, the first and the second communication control pins included in a data connector having a communication pin;
    detecting which of the first and the second communication control pins is an active communication control pin and an inactive communication control pin, based on at least detecting a current flow caused by at least the pulling-up, when coupled to the data connector and an external device, and to determine an orientation of the data connector based on the current flow or a change in voltage at the active communication control pin;
    pulling up, in response to the detecting of the active communication control pin, the active communication control pin, the pulling up of the active communication control pin greater than the pulling up of the inactive communication control pin; and
    coupling a communication circuitry to the active communication control pin, the communication circuitry configured to communicate according to a communication protocol after detecting the orientation of the data connector coupled to the external device.

15. A non-transitory computer-readable storage medium including computer code which when executed by at least one processor causes operations comprising:
    pulling down a first communication control pin and a second communication control pin, wherein the first and second communication control pins included in a data connector having a communication pin;
    detecting which of the first and the second communication control pins is an active communication control pin and an inactive communication control pin, based on at least detecting a current flow caused by at least the pulling down, when coupled to the data connector and external device, and to determine an orientation of the data connector based on the current flow or a change in voltage at the active communication control pin;
    pulling down, in response to the detecting of the active communication control pin, the inactive communication control pin, the pulling down of the inactive communication control pin greater than the pulling down of the active communication control pin; and
    coupling a communication circuitry to the active communication control pin, the communication circuitry configured to communicate according to a communication protocol after detecting the orientation of the data connector coupled to the external device.

* * * * *